Jan. 14, 1936.  A. M. ALLAN  2,027,852
TRAILER HITCH CONNECTION
Filed Nov. 5, 1934  2 Sheets-Sheet 1
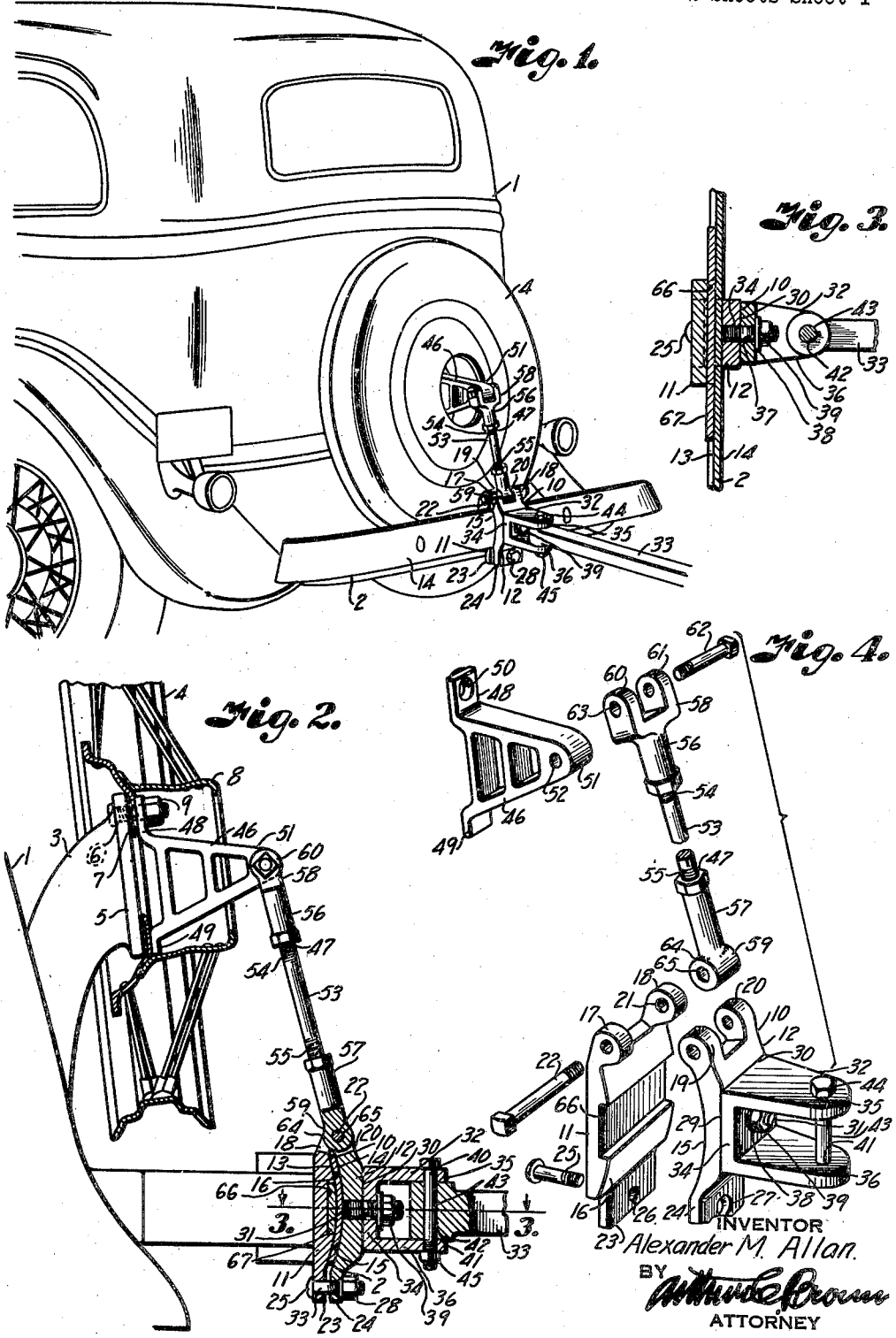
INVENTOR
Alexander M. Allan.
BY
Arthur C. Brown
ATTORNEY

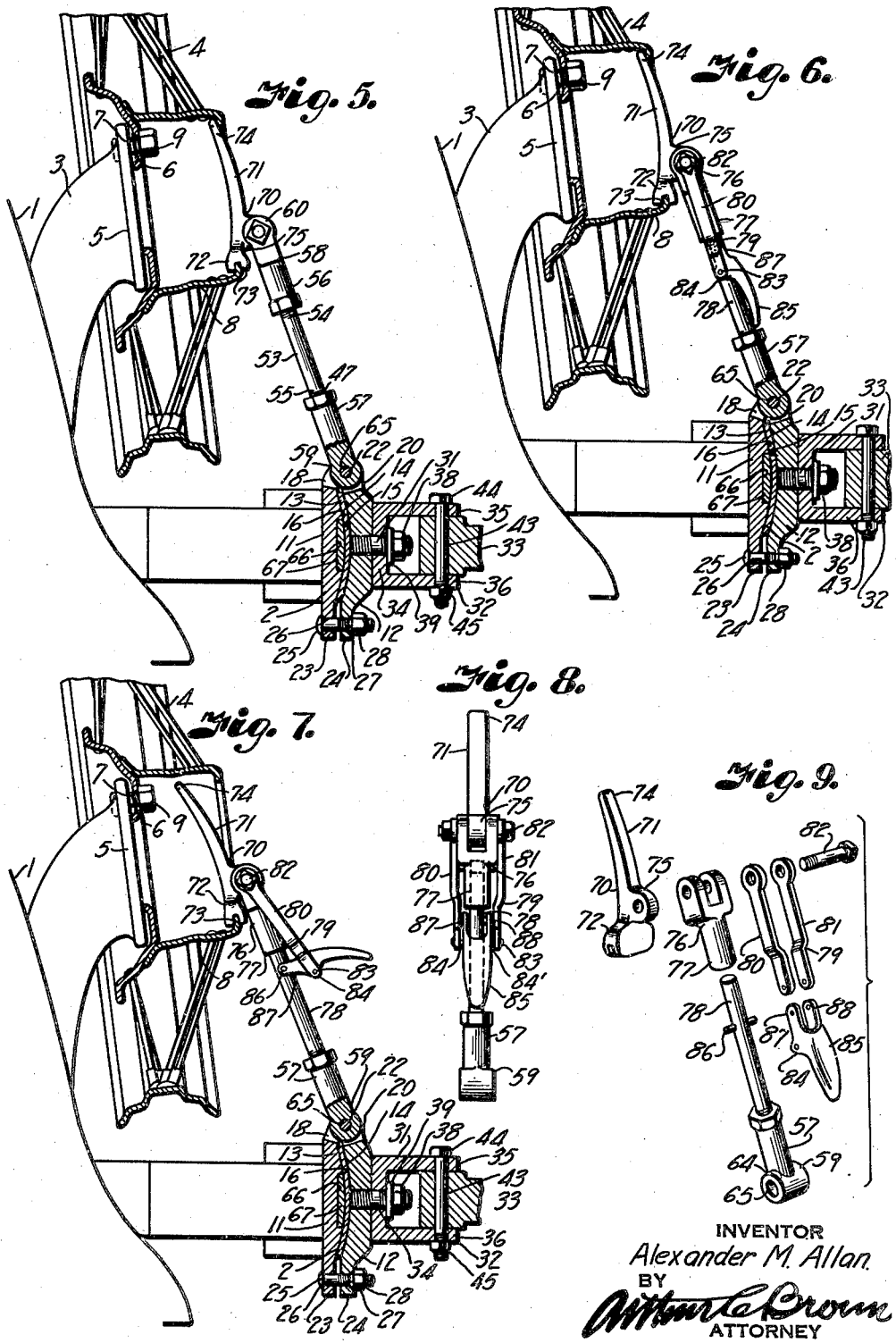

Patented Jan. 14, 1936

2,027,852

UNITED STATES PATENT OFFICE 2,027,852

TRAILER HITCH CONNECTION

Alexander M. Allan, Sapulpa, Okla.

Application November 5, 1934, Serial No. 751,540

16 Claims. (Cl. 280—33.44)

This invention relates to a trailer hitch connection and particularly to one of that character for securing a trailer to a motor vehicle and has for its principal object to provide a hitch connection that can be readily attached to and demounted from a vehicle without altering the vehicle structure.

Other important objects of the invention are to provide a simple, inexpensive hitch connection, to provide for distribution of the trailer pull so as to produce no undue strain on any one of the vehicle parts, and to provide for reinforcement of the vehicle parts to which the greatest strain is applied.

In accomplishing these and other objects of the invention, I have provided improved details of structure, the preferred form of which is illustrated in the accompanying drawings, wherein:

Fig. 1 is a perspective view of a trailer hitch connection constructed in accordance with the present invention and shown as applied to a motor vehicle.

Fig. 2 is a fragmentary side elevational view of the rear portion of the motor vehicle and the hitch connection as applied thereto, parts of the vehicle and hitch being shown in section to better illustrate the construction of the hitch.

Fig. 3 is a horizontal section on the line 3—3, Fig. 2, particularly illustrating the bumper reinforcement bar.

Fig. 4 is a perspective view of the parts of the trailer hitch connection shown in disassembled spaced relation.

Fig. 5 is a view similar to Fig. 2, but showing a modified form of brace bracket wherein the bracket is attached to the hub of the spare wheel.

Fig. 6 is a similar view showing a toggle type of brace in latched position.

Fig. 7 is a view similar to Fig. 6 showing the toggle in released position.

Fig. 8 is a detail view of the toggle.

Fig. 9 is a perspective view of the toggle parts in disassembled spaced relation.

Referring more in detail to the drawings:

1 designates a motor vehicle provided with a rear bumper 2 and a bracket 3 which mounts a spare wheel 4, the spare wheel 4 being secured to a flat plate portion 5 of the bracket by means of a stud 6 projecting through one of the bolt openings 7 of the wheel hub 8 and is equipped with a clamping nut 9 of conventional design. The parts thus far described specifically form no part of the present invention, but are parts of the vehicle with which my trailer hitch connection is associated, as now to be described.

In accordance with the present invention, the preferred form of hitch includes a clamp fixture 10 including clamping plates 11 and 12 for engaging the respective front and rear faces 13 and 14 of the bumper.

The clamping plates are best illustrated in Fig. 4 and are shown as having respectively concave and convex faces 15 and 16 conforming to the cross sectional shape of the bumper so that the plates will have snug contact with the bumper bar and can be rigidly anchored thereon. The plates are provided, preferably at their upper ends, with pairs of interengaging hinge lugs 17—18 and 19—20 having aligning openings 21 through which a hinge pin such as a bolt 22 is projected to secure the plates together and permit their application to the bumper as later described.

The opposite ends of the plates carry ears 23 and 24 extending substantially in the plane thereof and projecting below the lower edge of the bumper whereby the plates are secured in clamping engagement when a bolt 25 is extended through aligning openings 26 and 27 therein and retained by a nut 28 as best shown in Fig. 2. The outer face 29 of the outer plate member 12 is flattened as at 30 and carries a threaded stud 31 for mounting a clevis 32 by which the draft bar 33 of the trailer is connected.

The clevis preferably comprises a U shaped strap having a central bar portion 34 connecting rearwardly projecting ears 35 and 36, the bar portion 34 being provided with an opening 37 to admit the stud 31 which carries a washer 38 and nut 39 for securing the clevis thereon. The ears 35 and 36 of the clevis are spaced apart a sufficient distance to admit the draft bar therebetween and are provided with openings 40 and 41 aligning with the opening 42 of the bar to pass a coupling pin 43. The coupling pin 43 may be a bolt having a head 44 engaging one of the ears and a nut 45 engaging the other ear to retain it in position.

The clamping plates thus described provide a connection through which draft of the vehicle is transmitted to the trailer, but in order to prevent vibration and to distribute a portion of the draft to another part of the vehicle, the hitch connection includes a brace connecting the clamping plates with the spare wheel supporting bracket, as now to be described.

The wheel bracket is, therefore, provided with a bracket arm extension 46 adapted to extend through the hub 8 of the wheel 4 and connect with a turnbuckle rod 47. The arm 46 is preferably of A shape and includes flanged foot portions 48 and 49 for seating on that part of the wheel hub which is attached to the bracket, and one of the foot portions is provided with an opening 50 to pass the foot portion over the stud 6 in order that it can be anchored by the nut 9 which also retains the wheel as shown in Fig. 2. The apex 51 of the arm projects beyond the wheel hub and is provided with a transverse opening 52 for pivotally connecting the turnbuckle 47 as now to be described.

The turnbuckle includes a rod 53 having threaded ends 54 and 55 to engage the internally threaded sockets 56 and 57 of the yoke and T shaped heads 58 and 59 respectively. The yoke 58 includes a pair of laterally spaced ears 60 and 61 to engage the opposite side faces of the bracket arm 46 and is connected therewith by a bolt 62 extending through openings 63 in the ears and through the opening 52 in the arm. The T shaped head 59 has a sleeve portion 64 of suitable length to fit between the ears 19 and 20 of the plate 12 and has an opening 65 through which the hinge pin 22 is projected.

In order to reinforce the bumper, the plate 11 is preferably provided with a channel shaped recess 66 for mounting a reinforcing bar 67 in contact with the front 13 of the bumper and having its ends extending in coextensive relation therewith as shown in Fig. 1.

In applying a hitch connection constructed and assembled as described, the clamp members 11 and 12 carrying the turn buckle 47 and clevis 32 are mounted on the bumper and the reinforcing bar 67 is inserted through the recess 66. The bolt 25 is then applied to clamp the plates to the bumper and retain the reinforcing bar 67. The hub cap (not shown) is removed from the wheel hub to permit removal of the nut 9 from the stud 6, after which the bracket arm 46 is applied so that the foot 48 thereon engages over the stud 6 and the apex 51 thereof aligns with the clamping plates. The nut 9 is then reapplied to retain the bracket arm. The turnbuckle 47 is then adjusted as to length so that the openings 63 in the ears thereof align with the opening in the bracket arm to permit insertion of the bolt 62. The hitch connection is then ready for attachment of the draft bar 33 of the trailer hitch to the clevis 32 as in conventional practice.

In Fig. 5, the bracket 70 for connecting the upper end of the turnbuckle 47 is attached directly to the hub 8 of the spare wheel 4 and includes a bar 71 having a notched lower end 72 to engage over the inturned flange 73 of the hub, while the upper end 74 engages against the inner face of the flange upon tightening of the turnbuckle, the bar being provided with an ear 75 to connect with the yoke 58.

Figs. 6 to 9, inclusive, show the bracket 70 in connection with a toggle brace in place of the turnbuckle. This construction is desirable as it facilitates application of the hitch connection. In this form of the invention, the yoke 76 is equivalent to the yoke 58 of the first form of the invention, but has its socket end 77 provided with a smooth bore and is slidable on the end of the rod 78 that threadedly engages the T-shaped head 59. The yoke 76 is actuated on the rod to tighten the bracket 70 by a toggle lever 79. The toggle lever 79 includes straps 80 and 81 having their upper ends pivotally mounted on the ends of a bolt 82 which connects the yoke 76 to the bracket. The lower ends of the straps are pivotally connected by rivets 83 to ears 84 and 84' of a toggle actuating member 85 that straddles the rod and is pivotally connected thereto by means of a pin 86 extending through arms 87 and 88 thereon and through the rod 78. It is thus apparent that when the toggle is broken, as shown in Fig. 7, the yoke 76 is moved to the outer end of the rod to permit application of the bracket 70 to the wheel with its notched end seated over the flange 73.

Then when the toggle lever 85 is moved toward the rod to the position shown in Fig. 6, the yoke is drawn downwardly to cause clamping engagement of the bracket 70. The arms 87 and 88 extend at substantially right angles to the direction of the ears 83 and 84 so that the pivotal connections of the ears with the straps will pass dead center position relatively to the axes of the bolt 82 and pin 86, thereby automatically locking the toggle in clamping position as shown in Fig. 6.

From the foregoing it is obvious that I have provided a trailer hitch connection that is readily adjustable to fit the variable spacing of the spare wheel carrier and bumper of various type vehicles as well as the different angles between the points of attachment for the turnbuckle. When the hitch connection is attached it is rigidly connected to the vehicle and braced against any vibration tending to interfere with operation of the trailer.

What I claim and desire to secure by Letters Patent is:

1. A trailer hitch connection including a clamp fixture adapted for attachment to a bumper of a vehicle, draw bar connecting means carried by the clamp fixture, brace means adapted for connection with the vehicle through a spare wheel support of the vehicle, and means pivotally connecting the brace means with the clamp fixture.

2. In a trailer hitch connection, a clamp fixture including a pair of plates adapted to clampingly engage a bumper of a vehicle, draw bar connecting means carried by one of the plates, brace means adapted for connection with the vehicle through a spare tire support of the vehicle, and means pivotally connecting the brace means with the clamp fixture.

3. In a trailer hitch connection, a clamp fixture including hinged plates adapted to clampingly engage a bumper of a vehicle, a draw bar connecting means carried by one of the plates, brace means adapted for connection with the vehicle through a spare tire support of the vehicle, and means pivotally connecting the brace means with the clamp fixture.

4. In a trailer hitch connection, a clamp fixture including hinged plates adapted to clampingly engage a bumper of a vehicle, a draw bar connecting means carried by one of the plates, a bracket member adapted for attachment to a spare tire support of the vehicle, and a turnbuckle connecting the clamp fixture with the bracket.

5. In a trailer hitch connection, a clamp fixture including hinged plates adapted to clampingly engage a bumper of a vehicle, a draw bar connecting means carried by one of the plates, a bracket member adapted for attachment to a spare tire support of the vehicle, and a turn buckle hingedly connecting the clamp fixture with the bracket.

6. In combination with the bumper and spare wheel mounting of a vehicle, a trailer hitch connection including a pair of hinged plates clampingly engaging the bumper, means carried by the plates for attaching a draw bar, a bracket detachably connected to the spare wheel mounting, and a turnbuckle connecting the bracket with said hinge connection of the plates.

7. In combination with the bumper and spare wheel mounting of a vehicle, a trailer hitch connection including means for attaching the draw bar of the trailer to the bumper, and bracing means for the bumper connected with the spare wheel mounting.

8. In combination with the bumper and spare wheel mounting of a vehicle, a trailer hitch connection including means for attaching the draw bar of a trailer to the bumper, and adjustable bracing means connecting said draw bar attaching means with the spare wheel mounting.

9. In combination with the bumper and spare wheel mounting of a vehicle, a trailer hitch connection including means for attaching the draw bar of a trailer to the bumper, bracing means for the bumper and connected with the spare wheel mounting, and bumper reinforcing means carried by said attaching means.

10. In combination with the bumper and spare wheel mounting of a vehicle, a trailer hitch connection including a pair of hinged plates clampingly engaging the bumper means carried by the plates for attaching a draw bar, one of said plates having a recess, a bracket detachably connected to the spare wheel mounting, a turnbuckle connecting the bracket with said hinge connection of the plates, and a bumper reinforcing bar supported in the recess.

11. In combination with a vehicle having a bumper and a spare wheel provided with a hub, a clamp fixture attached to the bumper, a draft bar connection engaged with the clamp fixture, a bracket engaged with the hub of the spare wheel, and an adjustable brace connection between the bracket and clamp fixture.

12. In a trailer draft connection for the bumper of a motor vehicle, a pair of clamping plates for engaging the respective sides of the bumper, means hinging the plates together, means cooperating with the hinging means to clamp the plates in fixed position on the bumper, and a draw bar connection fixed to one of the plates.

13. In a trailer draft connection for the bumper of a motor vehicle, a pair of clamping plates for engaging the respective sides of the bumper, means hinging the plates together, means cooperating with the hinging means to clamp the plates in fixed position on the bumper, brace means connected with the hinging means for preventing vibration of the bumper, and means on one of the plates for attaching the draw bar of a trailing vehicle.

14. In a trailer draft connection for the bumper of a motor vehicle, a pair of clamping plates for engaging the respective sides of the bumper, means hinging the plates together, means cooperating with the hinging means to clamp the plates in fixed position on the bumper, a reinforcing bar having clamped engagement with the bumper incidental to clamping engagement of said plates and a draw bar connection fixed to one of the plates.

15. In combination with a vehicle having a bumper and a spare wheel provided with a hub, a clamp fixture attached to the bumper, a draft bar connection engaged with the clamp fixture, a bracket having foot portions engaged with opposite diametrical points of the wheel hub and an adjustable brace connection between the bracket and clamp fixture.

16. In combination with a vehicle having a bumper and a spare wheel carrying bracket, a clamp fixture adapted for attachment to the bumper, draw bar connecting means connected with said clamp fixture, a bracket for connection with the vehicle through said wheel bracket, and a toggle connecting said bracket with the clamp fixture.

ALEXANDER M. ALLAN.